US008247148B2

(12) United States Patent
Kayamoto et al.

(10) Patent No.: US 8,247,148 B2
(45) Date of Patent: Aug. 21, 2012

(54) RESIN-COATED FERRITE CARRIER FOR ELECTROPHOTOGRAPHIC DEVELOPER AND ELECTROPHOTOGRAPHIC DEVELOPER USING THE RESIN-COATED FERRITE CARRIER

(75) Inventors: Kanao Kayamoto, Chiba (JP); Issei Shinmura, Ibaraki (JP)

(73) Assignee: Powdertech Co., Ltd., Chiba (JP)

( * ) Notice: Subject to any disclaimer, the term of this patent is extended or adjusted under 35 U.S.C. 154(b) by 968 days.

(21) Appl. No.: 12/035,673

(22) Filed: Feb. 22, 2008

(65) Prior Publication Data
US 2008/0241729 A1    Oct. 2, 2008

(30) Foreign Application Priority Data
Mar. 29, 2007   (JP) ................... 2007-088772

(51) Int. Cl.
*G03G 9/00* (2006.01)

(52) U.S. Cl. .................................. 430/111.32
(58) Field of Classification Search .............. 430/111.32
See application file for complete search history.

(56) References Cited

U.S. PATENT DOCUMENTS

| 5,766,814 | A * | 6/1998 | Baba et al. ............ 430/111.32 |
| 5,821,023 | A | 10/1998 | Shibuya et al. |
| 6,146,801 | A | 11/2000 | Ichikawa et al. |
| 6,242,146 | B1 * | 6/2001 | Ishihara et al. ........... 430/110.4 |
| 6,405,007 | B1 * | 6/2002 | Aita et al. .................. 399/174 |
| 7,183,033 | B2 * | 2/2007 | Shinmura et al. ........ 430/111.33 |
| 7,244,539 | B2 * | 7/2007 | Baba et al. ............. 430/111.35 |
| 7,279,262 | B2 * | 10/2007 | Fujikawa et al. ........ 430/111.35 |
| 7,442,483 | B2 * | 10/2008 | Kobayashi et al. ........ 430/111.3 |
| 7,521,163 | B2 * | 4/2009 | Uemura et al. .......... 430/111.32 |
| 7,553,597 | B2 * | 6/2009 | Kobayashi et al. ........ 430/111.3 |
| 7,566,519 | B2 * | 7/2009 | Kobayashi et al. ...... 430/111.35 |
| 2004/0185366 | A1 | 9/2004 | Shinmura et al. |
| 2004/0229151 | A1 | 11/2004 | Kobayashi et al. |
| 2006/0003248 | A1 | 1/2006 | Kobayashi et al. |
| 2006/0121385 | A1 | 6/2006 | Uemura et al. |
| 2007/0048649 | A1 | 3/2007 | Kobayashi et al. |

FOREIGN PATENT DOCUMENTS

| JP | 62050839 | * | 3/1987 |
| JP | 02223962 | * | 9/1990 |
| JP | 9-305026 | | 11/1997 |
| JP | 9-319161 | | 12/1997 |
| JP | 10-39549 | | 2/1998 |
| JP | 11139827 | * | 5/1999 |
| JP | 2000-172019 | | 6/2000 |
| JP | 2006-38961 | | 2/2006 |
| JP | 2006-91439 | | 4/2006 |

OTHER PUBLICATIONS

Abstract of JP 62050839, Mar. 1987.*
Abstract of JP 02223962, Sep. 1990.*
Abstract of JP 11139827, May 1999.*
Machine English language translation of JP 11139827, May 1999.*
2 Abstract of JP 62050839, Mar. 1987.*
English language translation of JP 02223962, Sep. 1990.*

(Continued)

Primary Examiner — Hoa V Le
(74) Attorney, Agent, or Firm — Greenblum & Bernstein, P.L.C.

(57) ABSTRACT

Employed are a resin-coated ferrite carrier for an electrophotographic developer including a ferrite carrier core material having a BET specific surface area of 900 to 5,000 cm$^2$/g and an apparent density of 2.30 to 2.80 g/cm$^3$, and the electrophotographic developer using this resin-coated ferrite carrier.

16 Claims, 3 Drawing Sheets

OTHER PUBLICATIONS

English language Abstract of JP 2006-91439.
English language Abstract of JP2006-38961.
English language Abstract of JP 9-305026.
English language Abstract of JP9-319161.
English language Abstract of JP 10-39549.
English language Abstract of JP 2000-172019.
U.S. Appl. No. 12/034,884, filed Feb. 21, 2008.

* cited by examiner

RESIN-COATED FERRITE CARRIER FOR ELECTROPHOTOGRAPHIC DEVELOPER AND ELECTROPHOTOGRAPHIC DEVELOPER USING THE RESIN-COATED FERRITE CARRIER

TECHNICAL FIELD

The present invention relates to a resin-coated ferrite carrier for an electrophotographic developer used in a two-component electrophotographic developer used in copiers, printers and the like and an electrophotographic developer using this resin-coated ferrite carrier. More specifically, the present invention relates to a resin-coated ferrite carrier for an electrophotographic developer having good startup properties and high sphericity when used with a toner as a developer, and an electrophotographic developer using this resin-coated ferrite carrier.

BACKGROUND ART

Electrophotographic developing methods develop by adhering toner particles in a developer to an electrostatic latent image which is formed on a photoreceptor. The developer used in such methods can be classified as either being a two-component developer composed of toner particles and carrier particles, or a one-component developer which only uses toner particles.

Among such developers, as the developing method using a two-component developer composed of toner particles and carrier particles, a cascade method or the like has long been employed. However, currently magnetic brush methods using a magnet roll have become mainstream.

In a two-component developer, carrier particles act as a carrying substance for imparting the desired charge to the toner particles and transporting the thus-imparted toner particles with a charge to the surface of the photoreceptor to form a toner image on the photoreceptor by stirring the carrier particles with the toner particles in a developing box which is filled with the developer. Carrier particles remaining on the developing roll which supports the magnets return back into the developing box from this developing roll, and are then mixed and stirred with new toner particles for reuse over a certain time period.

Unlike one-component developers, in two-component developers the carrier particles are mixed and stirred with the toner particles to charge the toner particles. The carrier particles also have a transporting function and are easily controlled when designing the developer. Therefore, two-component developers are suitable for full color developing apparatuses in which high image quality is demanded and for apparatuses performing high-speed printing in which the reliability and durability of image sustainability are demanded.

In two-component developers which are used in such a manner, the image properties, such as image density, fogging, white spots, gradation and resolution, need to exhibit a certain value from the initial stage. Furthermore, these properties must not change during printing and have to be stably maintained. To stably maintain these properties, it is necessary for the properties of the carrier particles in the two-component developer to be stable.

Conventionally, an iron powder carrier, such as iron powder covered with an oxide coating on its surface or iron powder coated with a resin on its surface, has been used for the carrier particles forming a two-component developer. These iron powder carriers have high magnetization as well as high conductance, and thus have the advantage that an image with good reproducibility of the solid portions can be easily obtained.

However, the true specific gravity of such an iron powder carrier is about 7.8, which is heavy, and its magnetization is too high. As a consequence, the toner constituent component tends to fuse to the surface of the iron powder carrier, so-called "toner spent", from the stirring and mixing with the toner particles in the developing box. Due to the occurrence of toner spent, the effective carrier surface area decreases, whereby the frictional chargeability with the toner particles tends to deteriorate.

With a resin-coated iron powder carrier, the resin on the surface may peel away due to stress during use, causing charge to leak as a result of the high conductance, low breakdown voltage core material (iron powder) being exposed. The electrostatic latent image formed on the photoreceptor breaks down as a result of such charge leakage, thus causing brush strokes or the like to occur on the solid portions, which makes it difficult to obtain a uniform image. For these reasons, iron powder carriers, such as an oxide-coated iron powder or a resin-coated iron powder, are currently no longer used.

Recently, instead of iron powder carriers, often used are resin-coated ferrite carriers which use a ferrite having a light true specific gravity of about 5.0 and a low magnetization for the carrier and are further coated with a resin on their surface, whereby developer life has become dramatically longer.

There have been many attempts to improve the carrier properties and developer properties of such resin-coated carriers by specifying the surface properties and the like of the resin-coated carrier or carrier core material. Japanese Patent Laid-Open No. 2006-91439 describes a carrier for an electrophotographic developer with a specified shape factor (SF-1) which has excellent fluidity and is capable of forming a uniform mixed state between the toner and the carrier in a short time. In Japanese Patent Laid-Open No. 2006-91439, the shape factor (SF-1) is defined in a broad range, which means that the sphericity of the carrier also has a broad range and that variation is also large. Further, there is no description in Japanese Patent Laid-Open No. 2006-91439 regarding the BET specific surface area or apparent density of the carrier. Nevertheless, while Japanese Patent Laid-Open No. 2006-91439 does describe that the average particle size of the carrier is also 30 to 100 μm, the working examples only use a comparatively large particle size of 85 to 90 μm, and do not use small particle size carriers.

Further, Japanese Patent Laid-Open No. 2006-38961 describes a carrier for an electrophotographic developer in which a resin is coated onto a core material having a sphericity at or below a certain level and a surface roughness within a specified range. In Japanese Patent Laid-Open No. 2006-38961, by using the above-described carrier in a developer, a high-quality image is formed and image formation is stabilized against deterioration over time and environmental change. However, Japanese Patent Laid-Open No. 2006-38961 only defines sphericity and surface roughness, and does not define the variation in sphericity. Accordingly, the amount of deformed particles present is unclear. Further, there is no definition of the BET specific surface area or apparent density of the core material.

Further, Japanese Patent Laid-Open No. 9-305026 describes an image forming method using a carrier for an electrostatic latent image developer which has a shape factor (SF-1) and a shape factor (SF-2) in a specific range, in which the mechanical pressure applied to the developer is reduced so as to hardly damage the developer so that the initial properties of the developer are stably maintained even in the case of repeatedly using the developer. Further, Japanese Patent Laid-Open No. 9-319161 describes a carrier for an electrostatic latent image developer (claims 1 and 8) comprising on a core material which has a shape factor (SF-1) and a shape factor (SF-2) in a specific range a coated resin layer in which thermosetting resin microparticles having a specific critical surface tension are dispersed in a matrix resin. It is described that this carrier has a very long life, and is capable of long-term prevention of spent caused by toner on the carrier surface. Although Japanese Patent Laid-Open Nos. 9-305026 and 9-319161 do define carrier shape factor (SF-1) and shape factor (SF-2), there is no description concerning the microstructure of the surface of the carrier. Simply defining the shape factor such as in Japanese Patent Laid-Open Nos. 9-305026 and 9-319161 cannot be expected to improve startup properties when used in a developer. Further, there is no definition in Japanese Patent Laid-Open Nos. 9-305026 and 9-319161 of the BET specific surface area or apparent density of the core material.

Japanese Patent Laid-Open No. 10-39549 describes a magnetic coated carrier wherein the surface of carrier core particles having a specific resistance in a certain range or higher are coated using a resin composition at least containing a straight silicone resin and a coupling agent. This document describes that the carrier is well conferred with frictional charge with respect to the toner and that carrier adherence does not easily occur. However, Japanese Patent Laid-Open No. 10-39549 only defines the specific resistance of the carrier core particles, and contains no description concerning the BET specific surface area or apparent density. As described in Japanese Patent Laid-Open No. 10-39549, simply defining specific resistance would not be expected to improve startup properties when used in a developer.

Japanese Patent Laid-Open No. 2000-172019 describes a resin-coated carrier for a two-component developer in which the 50% particle size ($D_{50}$), % by number of carrier particles smaller than 22 μm and those 62 μm or larger, and the difference between the BET specific surface area of the carrier core material after resin removal and the BET specific surface area of the resin-coated carrier are within a certain range, and in which the shape factor (SF-1) and shape factor (SF-2) are in a specific range. This document describes that when used in a developer, a stable charge amount can be maintained even if used continuously for a long time, whereby a stable copy of an image can be obtained having no reduction in image density or occurrence of blurring. However, the BET specific surface area described in Japanese Patent Laid-Open No. 2000-172019 is the BET specific surface area of the carrier core material after resin removal, and is not the BET specific surface area of the carrier core material itself, and further, there is no description concerning the apparent density. Thus, an improvement in startup properties when used in a developer cannot be expected with a resin-coated carrier such as that described in Japanese Patent Laid-Open No. 2000-172019.

As described above, a resin-coated ferrite carrier for an electrophotographic developer having good sphericity and average particle size and which has improved startup properties when used as a developer is yet to be found.

DISCLOSURE OF THE INVENTION

Problems to be Solved by the Invention

Accordingly, it is an object of the present invention to provide a resin-coated ferrite carrier for an electrophotographic developer which has good sphericity and average particle size, small standard deviations thereof and dramatically improved startup properties when used with a toner as a developer, and an electrophotographic developer using this resin-coated ferrite carrier.

Means for Solving the Problems

As a result of extensive studies into resolving the above-described problems, the present inventors discovered that the above objectives can be achieved by using a ferrite carrier core material having a BET specific surface area and apparent density in a specific range, thereby arriving at the present invention.

Specifically, the present invention provides a resin-coated ferrite carrier for an electrophotographic developer including a ferrite carrier core material having a BET specific surface area of 900 to 5,000 cm$^2$/g and an apparent density of 2.30 to 2.80 g/cm$^3$.

In the resin-coated ferrite carrier for an electrophotographic developer according to the present invention, the ferrite carrier core material preferably has a long axis/short axis ratio average value of 1.00 to 1.20, a standard deviation of the long axis/short axis ratio of 0.3 or less and a percentage of particles having a long axis/short axis ratio of 1.10 or more of no more than 15%.

In the resin-coated ferrite carrier for an electrophotographic developer according to the present invention, the ferrite carrier core material preferably has a number average particle size of 20 to 50 μm, a standard deviation of 8.0 or less and a percentage of particles which are 19.3 μm or less of no more than 15% by number.

In the resin-coated ferrite carrier for an electrophotographic developer according to the present invention, the ferrite carrier core material is preferably obtained by thermal spraying.

In the resin-coated ferrite carrier for an electrophotographic developer according to the present invention, the ferrite carrier core material preferably has a magnetization of 30 to 95 Am$^2$/kg.

In the resin-coated ferrite carrier for an electrophotographic developer according to the present invention, a composition of the ferrite carrier core material is preferably represented by the following general formula (1), $$(AO)_x(Fe_2O_3)_y \qquad (1)$$

wherein x+y=100 mole %, X=0 to 70 mole %, y=100 to 30 mole % and A is one or more selected from among Mn, Mg, Li, Ca, Cu, Zn, Ni, Ti, Bi, Zr, Si and Fe.

In the resin-coated ferrite carrier for an electrophotographic developer according to the present invention, the ferrite carrier core material preferably has a volume resistivity of 10$^5$ to 10$^9$ Ω·m.

In the resin-coated ferrite carrier for an electrophotographic developer according to the present invention, preferably 0.1 to 10% by weight of resin is coated on the ferrite carrier core material.

The present invention also provides an electrophotographic developer comprising the above-described resin-coated ferrite carrier for an electrophotographic developer and a toner.

Effect of the Invention

The resin-coated ferrite carrier for an electrophotographic developer according to the present invention has good sphericity and average particle size, small standard deviations thereof and hardly any variation. Thus, when used with a toner as a developer, the startup properties are very good.

BEST MODE FOR CARRYING OUT THE INVENTION

Figure 1:
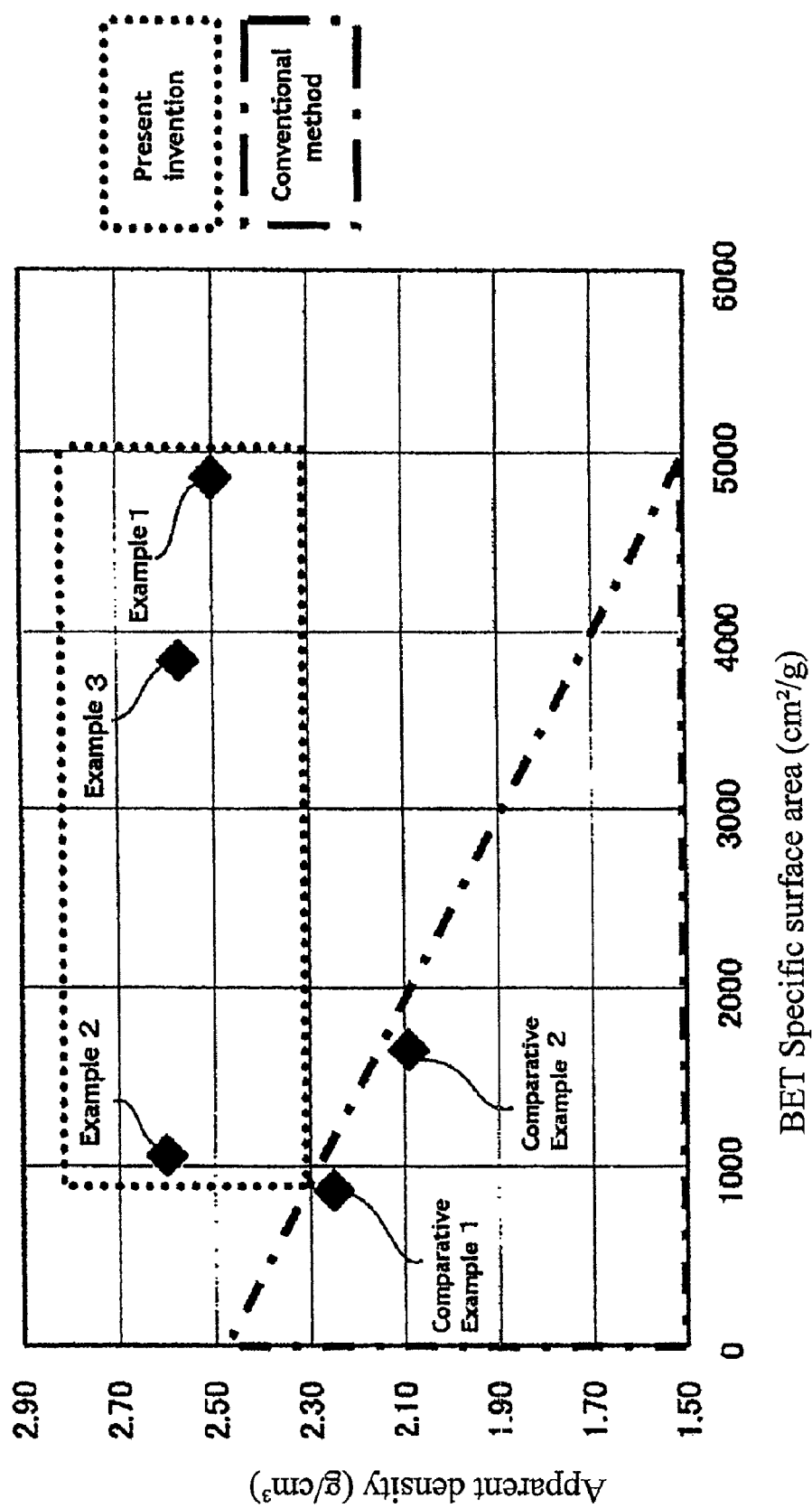
FIG. 1 is a graph showing the relationship between the BET specific surface area and apparent density of the ferrite carrier core materials of Examples 1 to 3 and Comparative examples 1 and 2.

Preferred embodiments for carrying out the present invention will be now described.

<Resin-Coated Ferrite Carrier for an Electrophotographic Developer According to the Present Invention>

The resin-coated ferrite carrier for an electrophotographic developer according to the present invention has a BET specific surface area and an apparent density of the ferrite carrier core material in a specific range. Thus, by using a ferrite carrier core material having a BET specific surface area and an apparent density in a specific range, good startup properties can be achieved when the resin-coated ferrite carrier is used in a developer.

Specifically, the BET specific surface area of the ferrite carrier core material used in the present invention is 900 to 5,000 cm$^2$/g, and preferably 1,000 to 4,900 cm$^2$/g. If the BET specific surface area of the ferrite carrier core material is less than 900 cm$^2$/g, an anchor effect during resin coating cannot be expected, whereby adhesion between the resin and the ferrite carrier deteriorates and the startup properties when used in a developer decrease. Further, if the BET specific surface area of the ferrite carrier core material is more than 5,000 cm$^2$/g, it is difficult to control the coat thickness uniformity of the resin-coated coat.

Further, the apparent density of the ferrite carrier core material used in the present invention is 2.30 to 2.80 g/cm$^3$, and preferably 2.40 to 2.70 g/cm$^3$. If the apparent density of the ferrite carrier core material is less than 2.30 g/cm$^3$, startup properties decrease when the particle size of the resin-coated ferrite carrier is reduced because of the weaker stress when mixing with the toner. Further, if the apparent density of the ferrite carrier core material is more than 2.80 g/cm$^3$, production of the ferrite carrier core material becomes difficult.

The ferrite carrier core material used in the present invention preferably has a long axis/short axis ratio average value of 1.00 to 1.20, a standard deviation of the long axis/short axis ratio of 0.3 or less and a percentage of particles having a long axis/short axis ratio of 1.10 or more of no more than 15%. If the long axis/short axis ratio average value of the ferrite carrier core material is more than 1.20, sphericity deteriorates, fluidity worsens and the startup properties decrease. If the standard deviation of the long axis/short axis ratio of the ferrite carrier core material is more than 0.30, the ratio of deformed particles increases, which causes the startup properties to decrease. If the percentage of particles having a long axis/short axis ratio of 1.10 or more is more than 15%, as described above, the ratio of deformed particles increases, which causes the startup properties to decrease.

The ferrite carrier core material used in the present invention preferably has, as the circle equivalent diameter, a number average particle size of 20 to 50 μm, a standard deviation of 8.0 or less and a percentage of particles which are 19.3 μm or less of no more than 15% by number. If the number average particle size of the ferrite carrier core material is less than 20 μm, carrier scattering increases, and if it is more than 50 μm, image density when used in a developer cannot be obtained. If the standard deviation of the number average particle size of the ferrite carrier core material is more than 8.0, there is an effect on image quality when used in a developer due to the distribution broadening. If the percentage of particles having a ferrite carrier core material number particle size of 19.3 μm or less is more than 15%, the ratio of fine powder increases, whereby carrier pulling occurs more easily.

The ferrite carrier core material used in the present invention is preferably produced by thermal spraying. If it is produced by a wet or dry method as conventionally used, as illustrated in FIG. 1, it is difficult to obtain a ferrite carrier having BET specific surface area and apparent density in the above-described ranges.

The ferrite carrier core material used in the present invention preferably has a magnetization of 30 to 95 Am$^2$/kg. If the magnetization of the ferrite carrier core material is less than 30 Am$^2$/kg, carrier scattering increases, and if it is more than 95 Am$^2$/kg, the bristles of the magnetic brush stiffen, which makes it difficult to obtain high image quality, and is thus not preferable.

The ferrite carrier core material used in the present invention preferably has a composition represented by the following general formula (1),

$$(AO)_x(Fe_2O_3)_y \quad (1)$$

wherein x+y=100 mole %, X=0 to 70 mole %, y=100 to 30 mole % and A is one or more selected from among Mn, Mg, Li, Ca, Cu, Zn, Ni, Ti, Bi, Zr, Si and Fe.

Considering the recent trend towards reducing environmental burden, such as restrictions on waste products, it is preferable for the heavy metals Cu, Zn and Ni to be contained in an amount which does not exceed the scope of unavoidable impurities (accompanying impurities).

The volume resistivity of the ferrite carrier core material used in the present invention is preferably 10$^5$ to 10$^9$ Ω·cm. If the volume resistivity of the ferrite carrier core material is less than 10$^5$ Ω·cm, a leak phenomenon tends to occur, whereby a high image quality cannot be obtained, which is not preferable. If the volume resistivity is more than 10$^9$ Ω·cm, it is difficult for image density to appear, which is thus also not preferable.

The resin-coated ferrite carrier core material for an electrophotographic developer according to the present invention is coated with a resin on the surface of the above-described ferrite carrier core material. The resin-coated amount is preferably 0.1 to 10% by weight of the ferrite carrier core material. If the resin-coated amount is less than 0.1% by weight, it is difficult to form a uniform coating layer on the carrier surface. If the resin-coated amount is more than 10% by weight, agglomerates between the carriers form, which not only reduces productivity by reducing the yield for instance, but also becomes a factor in variation of the developer properties, such as the fluidity or charge amount in the apparatus being used.

The coated resin used here may be appropriately selected according to the toner to be combined, the environment being used and the like. While the type of resin is not especially limited, examples include a fluororesin, acrylic resin, epoxy resin, polyamide resin, polyamideimide resin, polyester resin, unsaturated polyester resin, urea resin, melamine resin, alkyd resin, phenol resin, fluoroacrylic resin, acryl-styrene resin, silicone resin, and a modified silicone resin modified by an acrylic resin, polyester resin, epoxy resin, polyamide resin, polyamideimide resin, alkyd resin, urethane resin, fluororesin or the like. Taking into consideration detachment of the resin due to mechanical stress during use, a thermosetting resin is preferably used. Specific examples of the thermosetting resin include an epoxy resin, phenol resin, silicone resin, unsaturated polyester resin, urea resin, melamine resin, alkyd resin, and a resin containing these.

Further, a conductive agent may be added to the coating resin to be filled in order to control the electric resistance of the carrier and the charge amount and charge speed. Since the electric resistance of the conductive agent is itself low, there is a tendency for a charge leak to suddenly occur if the added amount is too large. Therefore, the added amount is 0.25 to 20.0% by weight, preferably 0.5 to 15.0% by weight and especially preferably 1.0 to 10.0% by weight, of the solid content of the coating resin. Examples of the conductive agent include conductive carbon, oxides such as titanium oxide and tin oxide, and various organic conductive agents.

In the above-described coating resin, a charge control agent can be contained. Examples of the charge control agent include various charge control agents generally used for toners and various silane coupling agents. This is because, although the charging capability is sometimes reduced if the exposed area of the core material is controlled so as to be comparatively small by the coat formation of the resin, it can be controlled by the addition of the charge control agent or silane coupling agent. The charge control agents and coupling agents which may be used are not especially limited. Preferable examples of the charge control agent include a nigrosin dye, quaternary ammonium salt, organic metal complex and metal-containing monoazo dye. Preferable examples of the silane coupling agent include an aminosilane coupling agent and fluorinated silane coupling agent.

<Method for Producing the Resin-Coated Ferrite Carrier for an Electrophotographic Developer According to the Present Invention>

A preferred method for producing the resin-coated ferrite carrier for an electrophotographic developer according to the present invention will now be described.

A preferred method for producing the ferrite carrier core material used in the resin-coated ferrite carrier for an electrophotographic developer according to the present invention is a thermal spraying method in which granulated matter obtained by preparing a ferrite carrier raw material is fertilized by thermally spraying in air, and then rapidly solidified.

The method for preparing the granulated matter using a ferrite carrier raw material is not especially limited. Conventionally-known methods may be employed, as well as methods using a dry process or a wet process.

One example of a method for preparing the granulated matter is to weigh out an appropriate amount of the ferrite raw material, add water, pulverize the resultant mixture to produce a slurry, granulate the produced slurry with a spray dryer and then classify to prepare granulated matter having a predetermined particle size. Considering the particle size of the resin-coated ferrite carrier to be obtained, the particle size of the granulated matter is preferably about 20 to 50 μm. Another example is to weigh out an appropriate amount of ferrite raw material, mix and pulverize by a dry process so that the respective raw materials are pulverized and dispersed, granulate the resultant mixture with a granulator and then classify to prepare granulated matter having a predetermined particle size.

The thus-prepared granulated matter is fertilized by thermally spraying in air. For the thermal spraying, a combustion gas and oxygen are used for the combustible gas combustion flame. The volume ratio of the combustion gas and oxygen is 1:3.5 to 6.0. If the ratio of oxygen in the combustible gas combustion flame is less than 3.5 with respect to the combustion gas, melting is insufficient. If the ratio of oxygen in the combustible gas combustion flame is more than 6.0 with respect to the combustion gas, fertilization is difficult. For example, oxygen may be used in a ratio of 35 to 60 $Nm^3/hr$ to 10 $Nm^3/hr$ of the combustion gas.

Examples of the combustion gas used in the thermal spraying include propane gas, propylene gas and acetylene gas. Propane gas is especially preferably used. Further, nitrogen, oxygen or air can be used as the granulated matter carrier gas. The granulated matter flow rate is preferably 20 to 60 m/sec.

The ferrite particles fertilized by thermal spraying in this manner are either rapidly solidified in air or rapidly solidified by charging into water.

Then, the particles are recovered, dried and classified. The particles are adjusted to a desired size using a conventionally-known classification method, such as air classification, mesh filtration and precipitation. If the recovery is carried out using a dry process, a cyclone or the like can be used.

Thereafter, the electric resistance can be optionally adjusted by heating the surface at a low temperature to carry out an oxide film treatment. The oxide film treatment is conducted using a common furnace such as a rotary electric furnace or batch-type electric furnace, and the heat-treatment may be carried out, for example, at 300 to 700° C. The thickness of the oxide film formed by this treatment is preferably 0.1 nm to 5 μm. If it is less than 0.1 nm, the effect of the oxide film is small. If it is more than 5 μm, the magnetization may decrease, and the resistance may become too high, whereby problems tend to occur such as a decrease in developing performance. Reduction may optionally be carried out before the oxide film treatment.

In the resin-coated ferrite carrier for an electrophotographic developer according to the present invention, the resin coat is formed by coating the above-described resin on the surface of a ferrite carrier core material obtained in the manner described above. Examples of the coating method include brush coating, a spray-dry method using a fluidized bed, a rotary-dry method and a liquid immersion-dry method using a universal stirrer. To improve the coating efficiency, a method using a fluidized bed is preferable.

After the carrier core material has been coated with a resin, baking may be carried out by either external heating or internal heating. The baking can be carried out using, for example, a fixed-type or flow-type electric furnace, rotary electric furnace, burner furnace, or even by using microwaves. In the case of using a UV-curable resin, a UV heater is used. Although the baking temperature depends on the resin which is used, the temperature must be equal to or higher than the melting point or the glass transition point. For a thermosetting resin or a condensation-crosslinking resin, the temperature must be increased to a point where sufficient curing proceeds.

<Electrophotographic Developer According to the Present Invention>

Next, the electrophotographic developer according to the present invention will be described.

The electrophotographic developer according to the present invention is composed of the above-described resin-coated ferrite carrier for an electrophotographic developer and a toner.

Examples of the toner particles constituting the electrophotographic developer according to the present invention include pulverized toner particles produced by a pulverizing method, and polymerized toner particles produced by a polymerizing method. In the present invention, toner particles obtained by either method can be used.

The pulverized toner particles can be obtained, for example, by thoroughly mixing a binding resin, a charge control agent and a colorant by a mixer such as a Henschel mixer, then melting and kneading with a twin screw extruder or the like, cooling, pulverizing, classifying, adding with external additives and then mixing with a mixer or the like.

The binding resin constituting the pulverized toner particle is not especially limited, and examples thereof include polystyrene, chloropolystyrene, styrene-chlorostyrene copolymer, styrene-acrylate copolymer and styrene-methacrylate copolymer, as well as a rosin-modified maleic acid resin, epoxide resin, polyester resin and polyurethane resin. These may be used alone or by mixed together.

The used charge control agent can be arbitrarily selected. Examples of a positively-charged toner include a nigrosin dye and a quaternary ammonium salt, and examples of a negatively-charged toner include a metal-containing monoazo dye.

As the colorant (coloring material), conventionally known dyes and pigments can be used. Examples include carbon black, phthalocyanine blue, permanent red, chrome yellow, phthalocyanine green. In addition, external additives such as a silica powder and titania for improving the fluidity and cohesion resistance of the toner can be added according to the toner particles.

Polymerized toner particles are produced by a conventionally known method such as suspension polymerization, emulsion polymerization, emulsion coagulation, ester extension and phase transition emulsion. The polymerization method toner particles can be obtained, for example, by mixing and stirring a colored dispersion liquid in which a colorant is dispersed in water using a surfactant, a polymerizable monomer, a surfactant and a polymerization initiator in an aqueous medium, emulsifying and dispersing the polymerizable monomer in the aqueous medium, and polymerizing while stirring and mixing. Then, the polymerized dispersion is charged with a salting-out agent, and the polymerized particles are salted out. The particles obtained by the salting-out are filtered, washed and dried to obtain the polymerized toner particles. Subsequently, an additive may optionally be added the dried toner particles.

Further, during the production of the polymerized toner particles, a fixation improving agent and a charge control agent can be blended in addition to the polymerizable monomer, surfactant, polymerization initiator and colorant, thereby allowing the various properties of the polymerized toner particles to be to controlled and improved. A chain-transfer agent can also be used to improve the dispersibility of the polymerizable monomer in the aqueous medium and to adjust the molecular weight of the obtained polymer.

The polymerizable monomer used in the production of the above-described polymerized toner particles is not especially limited, and examples thereof include styrene and its derivatives, ethylenic unsaturated monoolefins such as ethylene and propylene, halogenated vinyls such as vinyl chloride, vinyl esters such as vinyl acetate, and o-methylene aliphatic monocarboxylates, such as methyl acrylate, ethyl acrylate, methyl methacrylate, ethyl methacrylate, 2-ethylhexyl methacrylate, dimethylamino acrylate and diethylamino methacrylate.

As the colorant (coloring material) used for preparing the above polymerized toner particles, conventionally known dyes and pigments are usable. Examples include carbon black, phthalocyanine blue, permanent red, chrome yellow and phthalocyanine green. The surface of colorants may be improved by using a silane coupling agent, a titanium coupling agent and the like.

As the surfactant used for the production of the above polymerized toner particle, an anionic surfactant, a cationic surfactant, an amphoteric surfactant and a nonionic surfactant can be used.

Here, examples of anionic surfactants include sodium oleate, a fatty acid salt such as castor oil, an alkyl sulfate such as sodium lauryl sulfate and ammonium lauryl sulfate, an alkylbenzene sulfonate such as sodium dodecylbenzene sulfonate, an alkylnaphthalene sulfonate, an alkylphosphate, a naphthalenesulfonic acid-formalin condensate and a polyoxyethylene alkyl sulfate. Examples of nonionic surfactants include a polyoxyethylene alkyl ether, a polyoxyethylene aliphatic acid ester, a sorbitan aliphatic acid ester, a polyoxyethylene alkyl amine, glycerin, an aliphatic acid ester and an oxyethylene-oxypropylene block polymer. Further, examples of cationic surfactants include alkylamine salts such as laurylamine acetate, and quaternary ammonium salts such as lauryltrimethylammonium chloride and stearyltrimethylammonium chloride. In addition, examples of amphoteric surfactants include an aminocarbonate and an alkylamino acid.

A surfactant like that above can be generally used in an amount within the range of 0.01 to 10% by weight of the polymerizable monomer. Since the used amount of this surfactant affects the dispersion stability of the monomer as well as the environmental dependency of the obtained polymerized toner particles, the surfactant is preferably used in an amount within the above range where the dispersion stability of the monomer is secured, and the environmental dependency of the polymerized toner particles is unlikely to be excessively affected.

For the production of the polymerized toner particles, a polymerization initiator is generally used. Examples of polymerization initiators include water-soluble polymerization initiators and oil-soluble polymerization initiators, and either of them can be used in the present invention. Examples of water-soluble polymerization initiators which can be used in the present invention include persulfate salts such as potassium persulfate and ammonium persulfate, and water-soluble peroxide compounds. Examples of oil-soluble polymerization initiator include azo compounds such as azobisisobutyronitrile, and oil-soluble peroxide compounds.

In the case where a chain-transfer agent is used in the present invention, examples of the chain-transfer agent include mercaptans such as octylmercaptan, dodecylmercaptan and tert-dodecylmercaptan and carbon tetrabromide.

Further, in the case where the polymerized toner particles used in the present invention contain a fixation improving agent, examples thereof include a natural wax such as carnauba wax, and an olefinic wax such as polypropylene and polyethylene.

In the case where the polymerized toner particles used in the present invention contain a charge control agent, the charge control agent which is used is not especially limited. Examples include a nigrosin dye, a quaternary ammonium salt, an organic metal complex and a metal-containing monoazo dye.

Examples of the external additive used for improving the fluidity etc. of the polymerized toner particles include silica, titanium oxide, barium titanate, fluorocarbon resin fine particles and acrylic resin fine particles. These can be used alone or in combination thereof.

Further, examples of the salting-out agent used for separating the polymerized particles from the aqueous medium include metal salts such as magnesium sulfate, aluminum sulfate, barium chloride, magnesium chloride, calcium chloride and sodium chloride.

The average particle size of the toner particles produced as above is in the range of 2 to 15 μm, and preferably in the range of 3 to 10 μm. Polymerized toner particles have higher uniformity than pulverized toner particles. If the toner particles are less than 2 μm, charging capability is reduced, whereby fogging and toner scattering tend to occur. If the toner particles are more than 15 μm, this becomes a factor in deteriorating image quality.

By mixing the thus-produced carrier with a toner, an electrophotographic developer can be obtained. The mixing ratio of the carrier to the toner, namely, the toner concentration, is preferably set to be 3 to 15%. If the concentration is less than 3%, a desired image density is hard to obtain. If the concentration is more than 15%, toner scattering and fogging tend to occur.

The thus-mixed electrophotographic developer according to the present invention can be used in digital copying machines, printers, FAXs, printing presses and the like, which use a development system in which electrostatic latent images formed on a latent image holder having an organic photoconductor layer are reversal-developed by the magnetic brushes of a two-component developer having the toner and the carrier while impressing a bias electric field. The present developer can also be applied in full-color machines and the like which use an alternating electric field, which is a method that superimposes an AC bias on a DC bias, when the developing bias is applied from magnetic brushes to the electrostatic latent image side.

The present invention will now be described in more detail based on the following examples.

Instead of evaluating using an actual machine, in the present invention evaluation was carried out concerning charge amount, which is the most important of the developer properties, using the resin-coated carrier.

Example 1

Iron oxide ($Fe_2O_3$), manganese oxide (MnO) and magnesium oxide (MgO) were weighed out in a mole ratio of 50:40:10. Further, to total of 100 moles of these compounds, 0.8 moles of strontium oxide (SrO) were added, and the resultant mixture was mixed together. The mixture was charged with water and then pulverized to produce a slurry having a solid content of 50% by weight. The produced slurry was granulated using a spray dryer, and the granules were classified to obtain granulated matter having an average particle size of 30 μm.

Next, the obtained granulated matter was thermally sprayed into water by injecting at a flow rate of about 40 m/sec into a combustible gas combustion flame having a propane:oxygen ratio of 8 $Nm^3$/hr:32 $Nm^3$/hr. The resultant matter rapidly cooled, and was then recovered from the water, dried and classified to produce ferrite particles (ferrite carrier core material).

Figure 2:
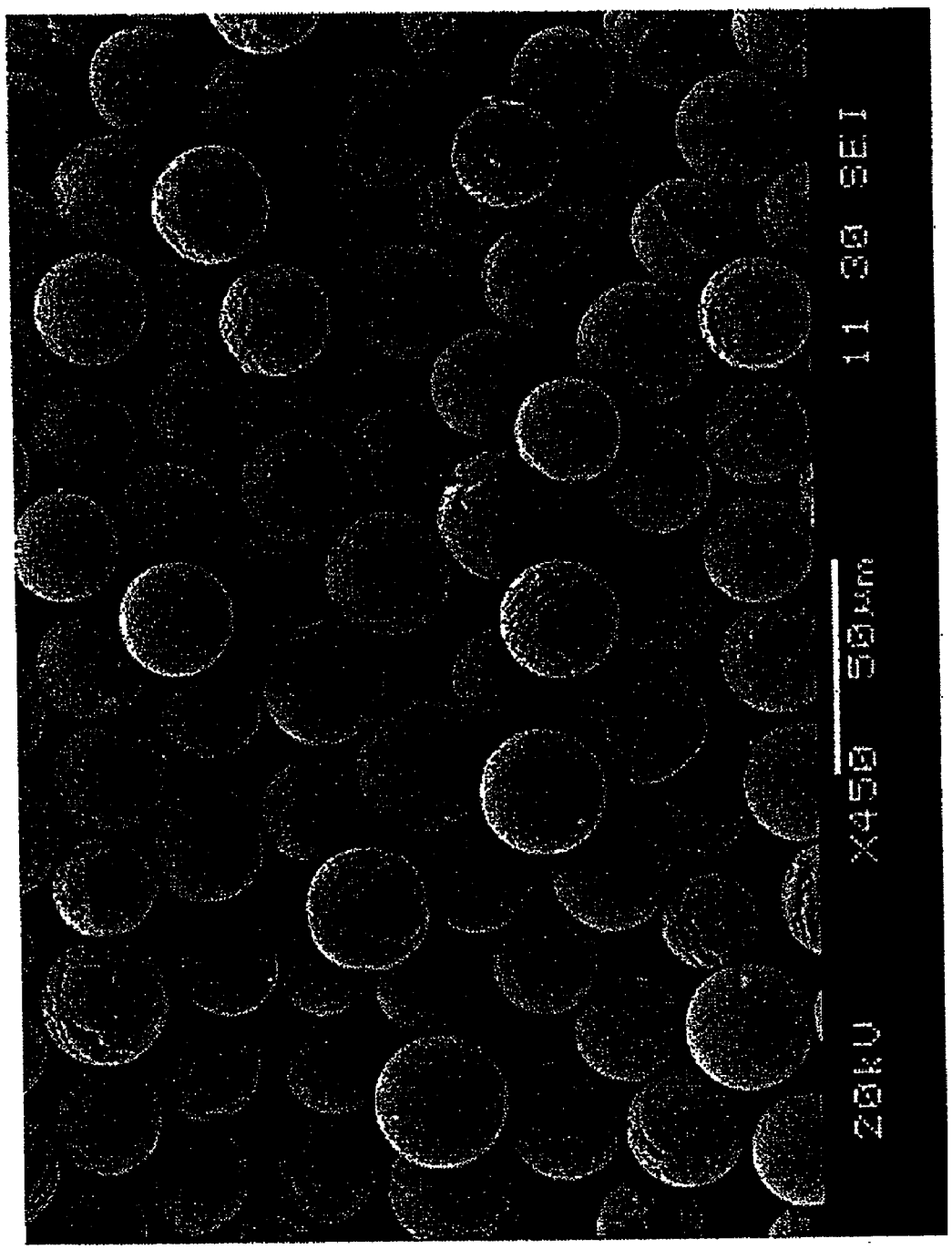
FIG. 2 is an SEM photograph (×450) of the ferrite carrier core material of Example 1.

The BET specific surface area, apparent density, long axis/short axis ratio (average value, standard deviation and percentage 1.10 or more), circle equivalent diameter (number average diameter, standard deviation and percentage 19.3 μm or less), magnetization and volume resistivity of the obtained ferrite carrier core material were measured by the following methods. The results are shown in Table 1. Further, the plotted relationship between BET specific surface area and apparent density is shown in FIG. 1. FIG. 2 shows an SEM photograph of the obtained ferrite carrier core material.

(BET Specific Surface Area)

The BET specific surface area of the ferrite carrier core material was measured using the "Micromeritics Automatic Surface Area Analyzer GEMINI 2360" (manufactured by Shimadzu Corporation). The measuring tube that was used had a straight tube portion outer diameter of 9.5 mm, a sample receptacle portion outer diameter of 19 mm, a length of 38 mm and a sample capacity of about 6.0 $cm^3$. Prior to measuring, baking was carried out for 1 hour at 200° C. under a nitrogen atmosphere. About 10 to 15 g of carrier particles were placed in the measuring tube, which was then correctly weighed by a precision balance. This sample was placed in the measuring tube, which was then attached to the analyzer. $N_2$ gas was made to adhere to the carrier particles, and the adhered amount was measured. The measurement was carried out using a ten point method. The BET specific surface area is automatically calculated by inputting the weight of the sample when the measurement finished. The measuring conditions were: a temperature of 10 to 30° C., and in terms of humidity, a relative humidity of 20 to 80%, with no condensation.

(Apparent Density)

Measurement was carried out according to JIS Z2504 (Apparent density test method for metal powders).

(Long Axis/Short Axis Ratio and Circle Equivalent Diameter)

The long axis/short axis ratio and circle equivalent diameter of the ferrite carrier core material were measured using the grain size/shape distribution analyzer PITA-1 (manufactured by Seishin Enterprise Co., Ltd.). The carrier powder was dispersed in a glycerin solution with a homogenizer, and then fed to a feeding tank. This dispersion solution was flowed to a lens particle size detector in a fixed amount, and 3,000 particles were measured using a CCD camera lens at a 10-times observation magnification. The number particle size distribution and the long axis/short axis ratio were automatically calculated.

(Magnetization)

Measurement was carried out using an integral-type B-H tracer BHU-60 (manufactured by Riken Denshi Co., Ltd.). An H coil for measuring magnetic field and a 4 πI coil for measuring magnetization were placed in between electromagnets. In this case, the sample was put in the 4 πI coil. The outputs of the H coil and the 4 πI coil when the magnetic field H was changed by changing the current of the electromagnets were each integrated; and with the H output as the X-axis and the 4 πI coil output as the Y-axis, a hysteresis loop was drawn on recording paper. The measuring conditions were a sample filling quantity of about 1 g, the sample filling cell had an inner diameter of 7 mm±0.02 mm and a height of 10 mm±0.1, and the 4 πI coil had a winding number of 30.

(Volume Resistivity)

In the present invention, volume resistivity was measured under a 23° C./60% RH environment. A cell having a cylindrical vessel (inner diameter of 25 mm×height of 55 mm×thickness of 3 mm, made from fluororesin) provided with an electrode at a lower portion was filled with carrier to a height of 45 mm, and then an upper-portion electrode 10 mm in height and weighing 65 g was placed thereon. A 1,000 V direct current voltage was applied to both electrodes. Resistance was measured using a TR-8601 manufactured by Advantest Corporation. Volume resistivity (Ω·cm) was calculated from the cross-sectional area and height of the above-described cell.

The ferrite carrier core material was dispersed with 2% by weight of silicone resin SR-2411 (manufactured by Dow Corning Toray Co., Ltd.) and 3% of carbon black based on the resin solid content, and coated with a resin using a fluidized bed coater. After resin coating, the resin was baked by heating for 3 hours at a temperature of 240° C. After the baking was finished, the resin was passed through a mesh and then underwent magnetic selection to produce a resin-coated ferrite carrier.

Figure 3:
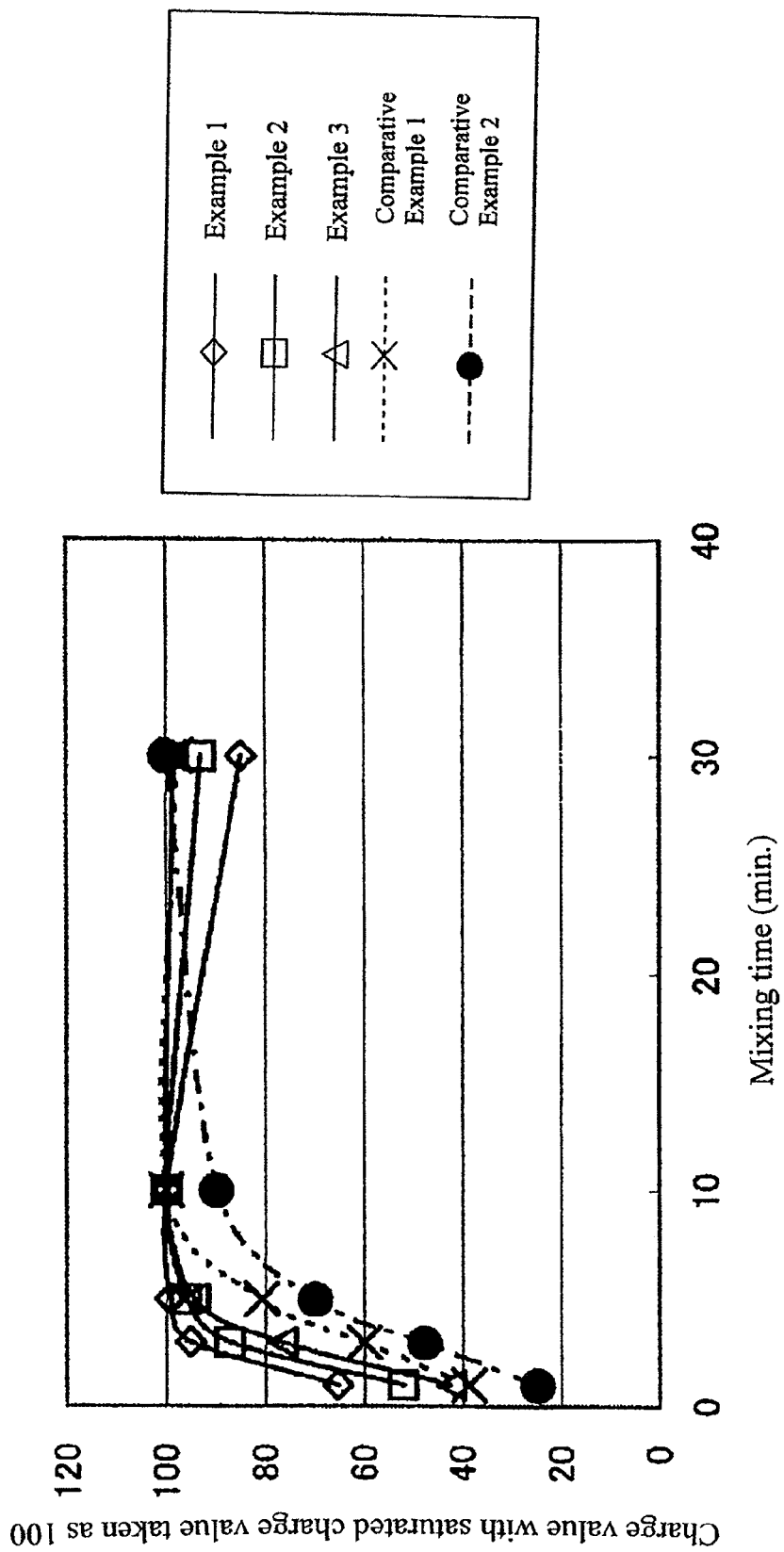
FIG. 3 is a graph showing each of the charge amounts for predetermined times when the saturated value of the charge amounts of Examples 1 to 3 and Comparative examples 1 and 2 are taken as 100.

Under a temperature of 23° C. and a 60% RH humidity environment, 88 g of this resin-coated ferrite carrier and 12 g of commercially-available negatively-charged toner were weighed and placed in a 100 cc plastic bottle. The mixture was mixed using a ball mill by 100 rotations in a vertical direction. The charge amount at predetermined times (1 minute, 3 minutes, 5 minutes, 10 minutes and 30 minutes) was measured by the following method, and this was taken as the substitute property for the developer properties. The measured results are shown in Table 2. In addition, each of the charge amount values from the predetermined times with the charge amount saturated value being taken as 100 was displayed as an index, and those results are shown in Table 3 and FIG. 3.

(Charge Amount)

Under a temperature of 23° C. and a 60% RH humidity environment, and using a suction type charge measurement device (Epping q/m-meter, manufactured by PES-Laboratorium), the cell was set to 795 Mesh (16 μm aperture), and about 1 cc of the developer was weighed and collected and then charged into the cell. The toner was then separated by suction at a suction pressure of 105±5 hPa for 1 minute to measure the charge amount.

Example 2

Granulated matter was obtained and then ferrite particles (ferrite carrier core material) produced in the same manner as in Example 1, except that iron oxide ($Fe_2O_3$) was used as the ferrite raw material. The BET specific surface area, apparent density, long axis/short axis ratio (average value, standard deviation and percentage 1.10 or more), circle equivalent diameter (number average diameter, standard deviation and percentage 19.3 μm or less), magnetization and resistivity of the obtained ferrite carrier core material were measured in the same manner as in Example 1. The results are shown in Table 1. Further, the plotted relationship between BET specific surface area and apparent density is shown in FIG. 1.

The ferrite carrier core material was coated with a resin using the same silicone resin as in Example 1, then baked and subjected to magnetic selection to produce a resin-coated ferrite carrier. Charge amount was measured by the same method as in Example 1. The measured results are shown in Table 2, and each of the charge amount values from the predetermined times with the charge amount saturated value being taken as 100 are shown in Table 3 and FIG. 3.

Example 3

Granulated matter was obtained and then ferrite particles (ferrite carrier core material) produced in the same manner as in Example 1, except that iron oxide ($Fe_2O_3$) and manganese oxide (MnO) were used as the ferrite raw material in a mole ratio of 80:20. The BET specific surface area, apparent density, long axis/short axis ratio (average value, standard deviation and percentage 1.10 or more), circle equivalent diameter (number average diameter, standard deviation and percentage 19.3 μm or less), magnetization and resistivity of the obtained ferrite carrier core material were measured in the same manner as in Example 1. The results are shown in Table 1. Further, the plotted relationship between BET specific surface area and apparent density is shown in FIG. 1.

The ferrite carrier core material was coated with resin in the same manner as in Example 1, except that the silicone resin was changed to an acrylic resin (BR-52, manufactured by Mitsubishi Rayon Co., Ltd.), then baked and subjected to magnetic selection to produce a resin-coated ferrite carrier. Charge amount was measured by the same method as in Example 1. The measured results are shown in Table 2, and each of the charge amount values from the predetermined times with the charge amount saturated value being taken as 100 are shown in Table 3 and FIG. 3.

Comparative Example 1

Granulated matter was obtained in the same manner as in Example 1 using the same ferrite raw material as in Example 3.

Next, the obtained granulated matter was baked in an electric furnace at a temperature of 1,250° C. and an oxygen concentration of 0.1%. Crushing and classification were then carried out to obtain ferrite particles (ferrite carrier core material). The BET specific surface area, apparent density, long axis/short axis ratio (average value, standard deviation and percentage 1.10 or more), circle equivalent diameter (number average diameter, standard deviation and percentage 19.3 μm or less), magnetization and resistivity of the obtained ferrite carrier core material were measured in the same manner as in Example 1. The results are shown in Table 1. Further, the plotted relationship between BET specific surface area and apparent density is shown in FIG. 1.

The ferrite carrier core material was coated with resin using the same acrylic resin as in Example 3, then baked and subjected to magnetic selection to produce a resin-coated ferrite carrier. Charge amount was measured by the same method as in Example 1. The measured results are shown in Table 2, and each of the charge amount values from the predetermined times with the charge amount saturated value being taken as 100 are shown in Table 3 and FIG. 3.

Comparative Example 2

Granulated matter was obtained in the same manner as in Example 1 using the same ferrite raw material as in Example 1.

Next, the obtained granulated matter was baked in an electric furnace at a temperature of 1,150° C. and an oxygen concentration of 0.1%. Crushing and classification were then carried out to obtain ferrite particles (ferrite carrier core material). The BET specific surface area, apparent density, long axis/short axis ratio (average value, standard deviation and percentage 1.10 or more), circle equivalent diameter (number average diameter, standard deviation and percentage 19.3 μm or less), magnetization and resistivity of the obtained ferrite carrier core material were measured in the same manner as in Example 1. The results are shown in Table 1. Further, the plotted relationship between BET specific surface area and apparent density is shown in FIG. 1.

The ferrite carrier core material was coated with resin using the same silicone resin as in Example 1, then baked and subjected to magnetic selection to produce a resin-coated ferrite carrier. Charge amount was measured by the same method as in Example 1. The measured results are shown in Table 2, and each of the charge amount values from the predetermined times with the charge amount saturated value being taken as 100 are shown in Table 3 and FIG. 3.

TABLE 1

| | BET | | Long axis/short axis ratio | | | Circle equivalent diameter | | | | |
|---|---|---|---|---|---|---|---|---|---|---|
| | Specific | | | | | Number | | | | |
| | surface area (cm²/g) | Apparent density (g/cm³) | Average value | Standard deviation | Percentage 1.10 or more | average diameter (μm) | Standard deviation | Percentage 19.3 μm or less | Magnetization (Am²/kg) | Resistivity (Ω·cm) |
| Example 1 | 4866 | 2.50 | 1.07 | 0.15 | 7.8 | 29.4 | 7.1 | 9.9 | 74 | $2.0 \times 10^9$ |
| Example 2 | 1059 | 2.60 | 1.13 | 0.27 | 14.8 | 25.5 | 5.7 | 7.0 | 90 | $6.8 \times 10^7$ |
| Example 3 | 3836 | 2.57 | 1.10 | 0.24 | 9.0 | 48.0 | 5.9 | 0.0 | 94 | $3.0 \times 10^8$ |
| Comparative example 1 | 863 | 2.25 | 1.25 | 0.26 | 60.2 | 23.0 | 6.6 | 18.2 | 92 | $5.3 \times 10^8$ |
| Comparative example 2 | 1653 | 2.09 | 1.30 | 0.32 | 20.5 | 35.0 | 8.5 | 3.0 | 72 | $9.2 \times 10^9$ |

TABLE 2

Startup performance (μc/g)

| | 1 minute | 3 minutes | 5 minutes | 10 minutes | 30 minutes (μc/g) |
|---|---|---|---|---|---|
| Example 1 | 23.9 | 34.8 | 36.3 | 36.6 | 31.1 |
| Example 2 | 29.1 | 48.6 | 53.4 | 55.7 | 51.7 |
| Example 3 | 19.4 | 35.0 | 43.1 | 45.7 | 45.0 |
| Comparative example 1 | 18.5 | 28.6 | 38.6 | 47.8 | 46.8 |
| Comparative example 2 | 11.1 | 21.3 | 31.2 | 40.1 | 44.7 |

TABLE 3

Charge value with the saturated value as 100

| | 1 minute | 3 minutes | 5 minutes | 10 minutes | 30 minutes |
|---|---|---|---|---|---|
| Example 1 | 65.4 | 95.1 | 99.2 | 100.0 | 84.9 |
| Example 2 | 52.2 | 87.2 | 95.9 | 100.0 | 92.9 |
| Example 3 | 42.3 | 76.5 | 94.4 | 100.0 | 98.4 |
| Comparative example 1 | 38.7 | 59.8 | 80.8 | 100.0 | 97.8 |
| Comparative example 2 | 24.8 | 47.7 | 69.8 | 89.7 | 100.0 |

As is clear from the results shown in Table 1, the ferrite carrier core materials shown in Examples 1 to 3 have good sphericity and average particle size, and the standard deviations thereof are also small. Further, as is clear from the results shown in Tables 2 and 3, and in FIG. 3, in Example 1 to 3, the startup properties are good.

In contrast, as is clear from the results shown in Table 1, the ferrite carrier core materials shown in Comparative examples 1 and 2 have a large long axis/short axis ratio, poor sphericity and a large variation. In addition, in Comparative example 1, the circle equivalent diameter standard deviation is poor, and in Comparative example 2, the percentage having a circle equivalent diameter of 19.3 μm or less is poor. Further, as is clear from the results shown in Tables 2 and 3, in Comparative examples 1 and 2, the startup properties are poor.

INDUSTRIAL APPLICABILITY

The resin-coated ferrite carrier for an electrophotographic developer according to the present invention has good sphericity and average particle size, and the standard deviations thereof are small, meaning that variation is also small. Further, when used with a toner as a developer, startup properties can also be dramatically improved.

Therefore, an electrophotographic developer using the resin-coated ferrite carrier for an electrophotographic developer according to the present invention can be widely used especially in the fields of full color machines in which high quality images are demanded, as well as high-speed printers in which the reliability and durability of image sustainability are demanded.

What is claimed is:

1. A resin-coated ferrite carrier for an electrophotographic developer comprising a ferrite carrier core material obtained by thermal spraying and including a surface, and a resin coated on the surface, the ferrite carrier core material having a BET specific surface area of 900 to 5,000 cm²/g, an apparent density of 2.40 to 2.70 g/cm³, a long axis/short axis ratio average value of 1.00 to 1.20, a standard deviation of the long axis/short axis ratio of 0.3 or less, and percentage of particles having a long axis/short axis ratio of 1.10 or more of no more than 15%.

2. The resin-coated ferrite carrier for an electrophotographic developer according to claim 1, wherein the ferrite carrier core material has a number average particle size of 20 to 50 μm, a standard deviation of 8.0 or less and a percentage of particles which are 19.3 μm or less of no more than 15% by number.

3. The resin-coated ferrite carrier for an electrophotographic developer according to claim 1, wherein the ferrite carrier core material has a magnetization of 30 to 95 Am²/kg.

4. The resin-coated ferrite carrier for an electrophotographic developer according to claim 1, wherein a composition of the ferrite carrier core material is represented by the following general formula (1), $$(AO)_x(Fe_2O_3)_y \qquad (1)$$

wherein x+y=100 mole %, X=0 to 70 mole %, y=100 to 30 mole % and A is one or more selected from among Mn, Mg, Li, Ca, Cu, Zn, Ni, Ti, Bi, Zr, Si and Fe.

5. The resin-coated ferrite carrier for an electrophotographic developer according to claim 1, wherein the ferrite carrier core material has a volume resistivity of $10^5$ to $10^9$ Ω·cm.

6. The resin-coated ferrite carrier for an electrophotographic developer according to claim 1, wherein 0.1 to 10% by weight of resin is coated on the ferrite carrier core material.

7. An electrophotographic developer comprising the resin-coated ferrite carrier for an electrophotographic developer according to claim 1 and a toner.

8. An electrophotographic developer comprising the resin-coated ferrite carrier for an electrophotographic developer according to claim 2 and a toner.

9. An electrophotographic developer comprising the resin-coated ferrite carrier for an electrophotographic developer according to claim 3 and a toner.

10. An electrophotographic developer comprising the resin-coated ferrite carrier for an electrophotographic developer according to claim 4 and a toner.

11. An electrophotographic developer comprising the resin-coated ferrite carrier for an electrophotographic developer according to claim 5 and a toner.

12. An electrophotographic developer comprising the resin-coated ferrite carrier for an electrophotographic developer according to claim 6 and a toner.

13. The resin-coated ferrite carrier for an electrophotographic developer according to claim 1, wherein the ferrite carrier core material has an apparent density of 2.50 to 2.70 g/cm$^3$.

14. An electrophotographic developer comprising the resin-coated ferrite carrier for an electrophotographic developer according to claim 13 and a toner.

15. The resin-coated ferrite carrier for an electrophotographic developer according to claim 1, wherein the ferrite carrier core material has an apparent density of 2.50 to 2.60 g/cm$^3$.

16. An electrophotographic developer comprising the resin-coated ferrite carrier for an electrophotographic developer according to claim 15 and a toner.

* * * * *